SYSTEM FOR LOCALIZING RADIO COMMUNICATIONS

Filed March 4, 1964 5 Sheets-Sheet 1

Inventors
CHARLES W. EARP
RICHARD F. CLEAVER
PETER SOTHCOTT
By Philip M. Bolton
Attorney Inventors
CHARLES W. EARP
RICHARD F. CLEAVER
PETER SOTHCOTT
By Philip M. Bolton
Attorney Inventors
CHARLES W. EARP
RICHARD F. CLEAVER
PETER SOTHCOTT
By Philip M. Bolton
Attorney Inventors
CHARLES W. EARP
RICHARD F. CLEAVER
PETER SOTHCOTT
By Philip M. Bolton
Attorney Inventors
CHARLES W. EARP
RICHARD F. CLEAVER
PETER SOTHCOTT
By Philip M. Bolton
Attorney 3,335,418

SYSTEM FOR LOCALIZING RADIO COMMUNICATIONS

Charles William Earp, Richard Francis Cleaver, and Peter Sothcott, all of London, England, assignors to International Standard Electric Corporation, New York, N.Y., a corporation of Delaware Filed Mar. 4, 1964, Ser. No. 349,372
15 Claims. (Cl. 343—101)

This invention relates to radio communication systems, and to methods for communicating exclusively with one of a number of craft or vehicles.

The term "singularity of an electromagnetic radiation field" as used in this specification means a characteristic of the field which is present substantially only either at a point or along a given line, or in any other narrowly defined region in space in which, for practical purposes, the probability of the presence of a craft or vehicle other than that being called is so small as to be negligible.

According to the invention there is provided a radio communication system including means to determine a co-ordinate of the position of a craft or vehicle, and means to so control the position of a singularity of an electromagnetic radiation field in dependence upon the determined co-ordinate.

According to one feature of the invention the radio communication system includes two transmitting stations and means so to direct signals from each of the stations that they coincide only along a line.

According to another feature of the invention the radio communication system includes three transmitting stations and means to vary the time of transmission of a signal from each of the stations.

According to yet another feature of the invention the radio communication system includes at least two transmitting stations each having means either to produce or to simulate cyclic movement along a path of an aerial energized with radio frequency energy and means to vary the orientation of each of the paths so as to produce a resultant phase modulated radio frequency field having zero phase modulation substantially only along a required line space.

Figure 1:
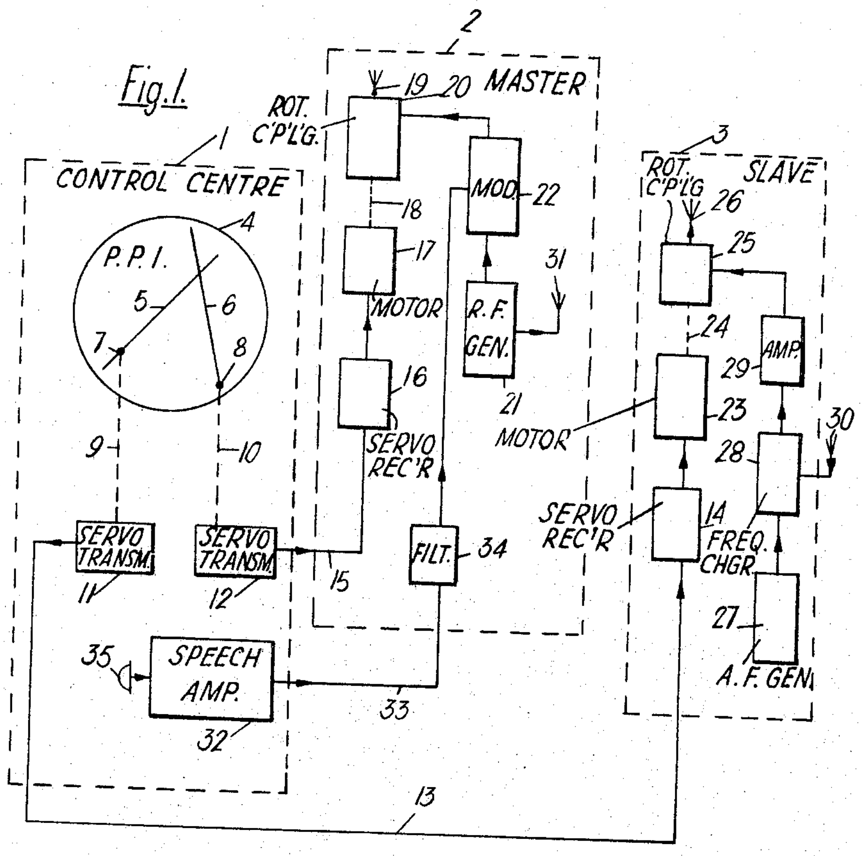
Figure 2:
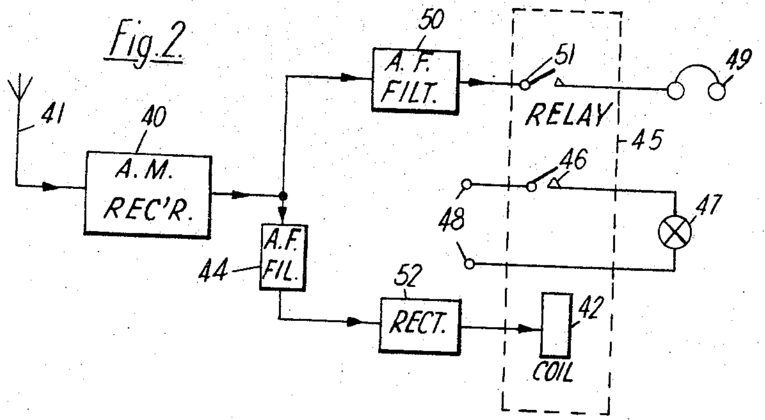
Figure 3:
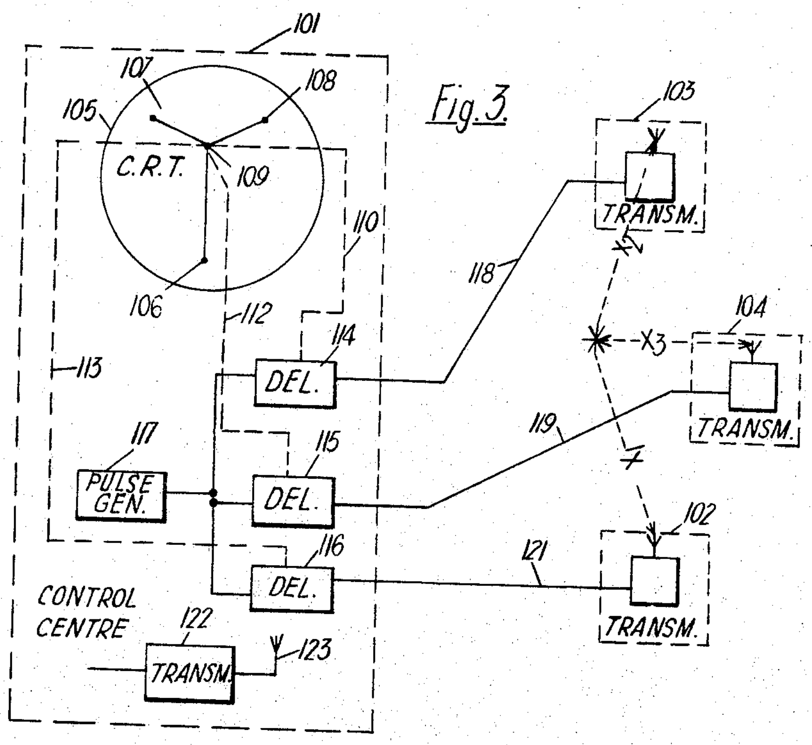
Figure 4:
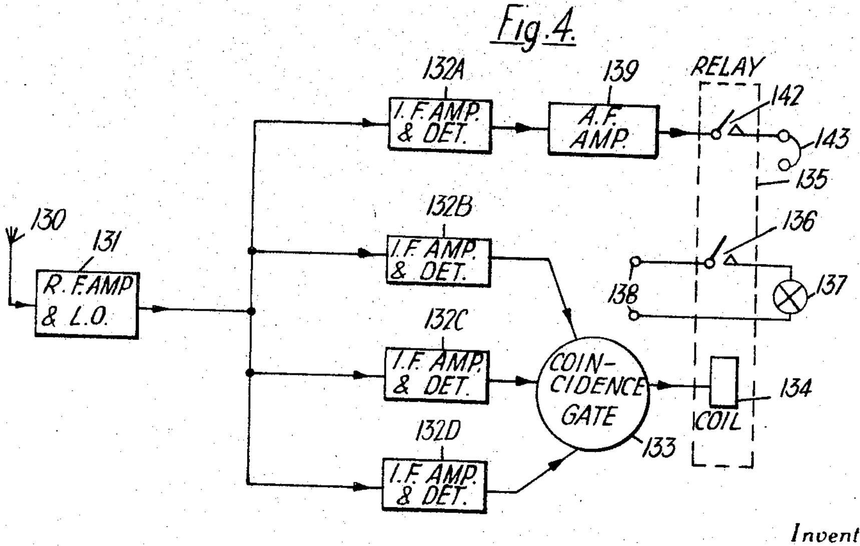
Figure 5:
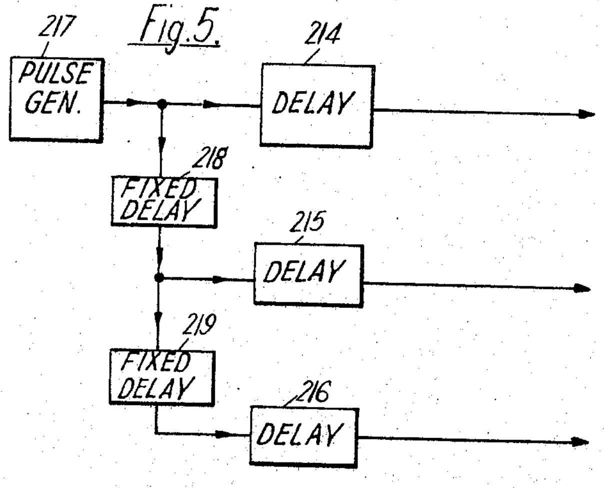
Figure 6:
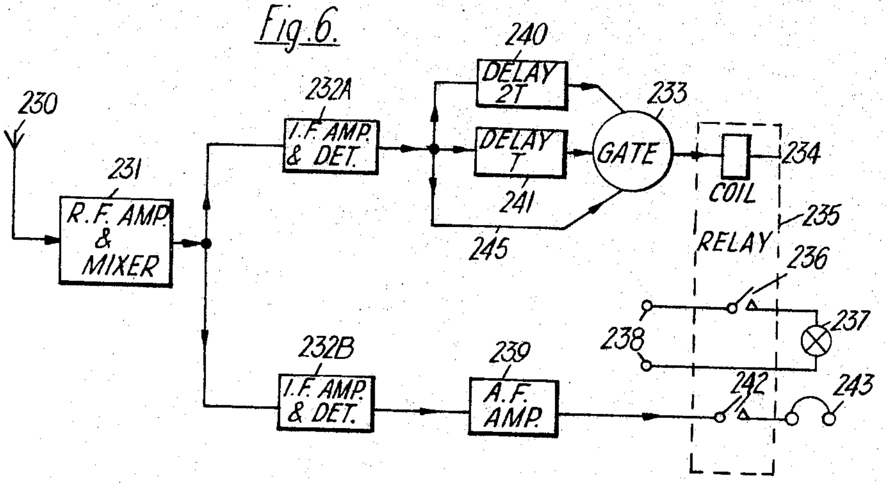
Figure 7:
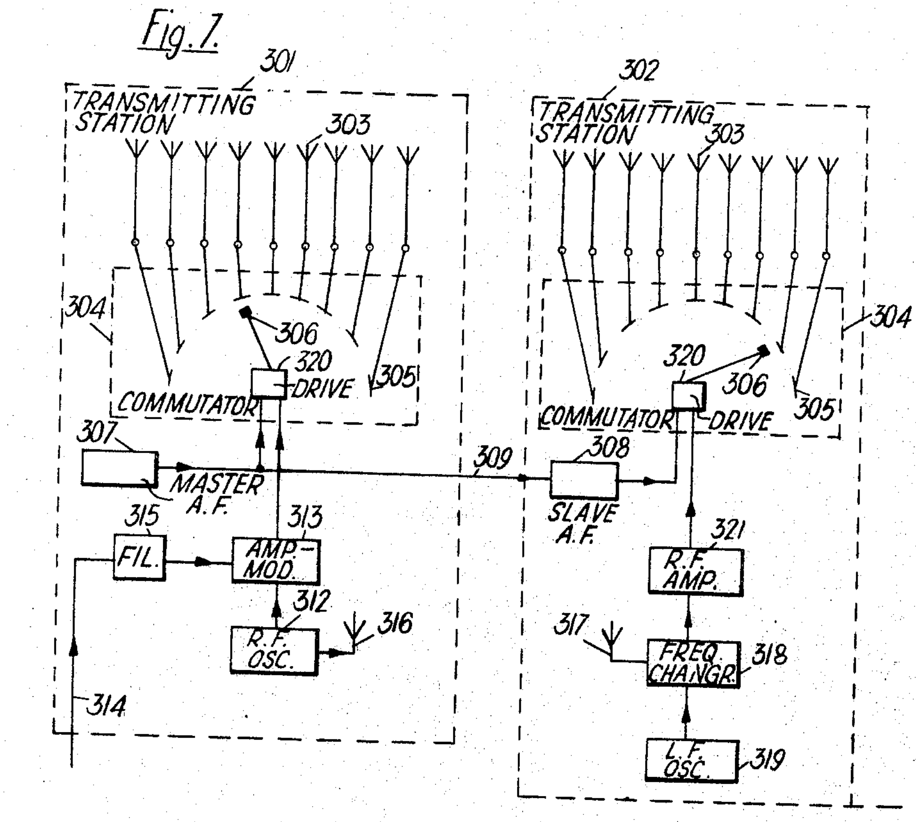
Figure 8:
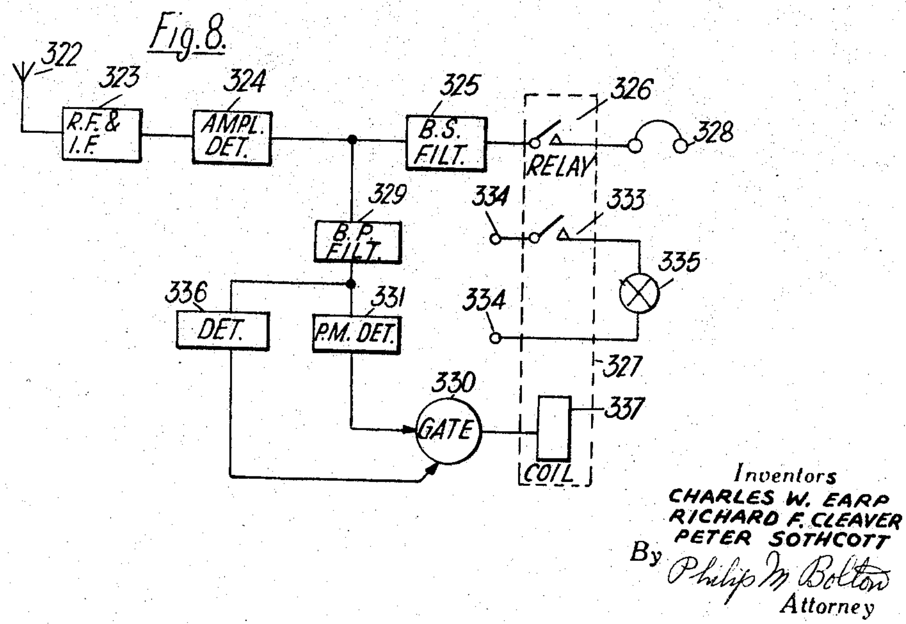
Figure 9:
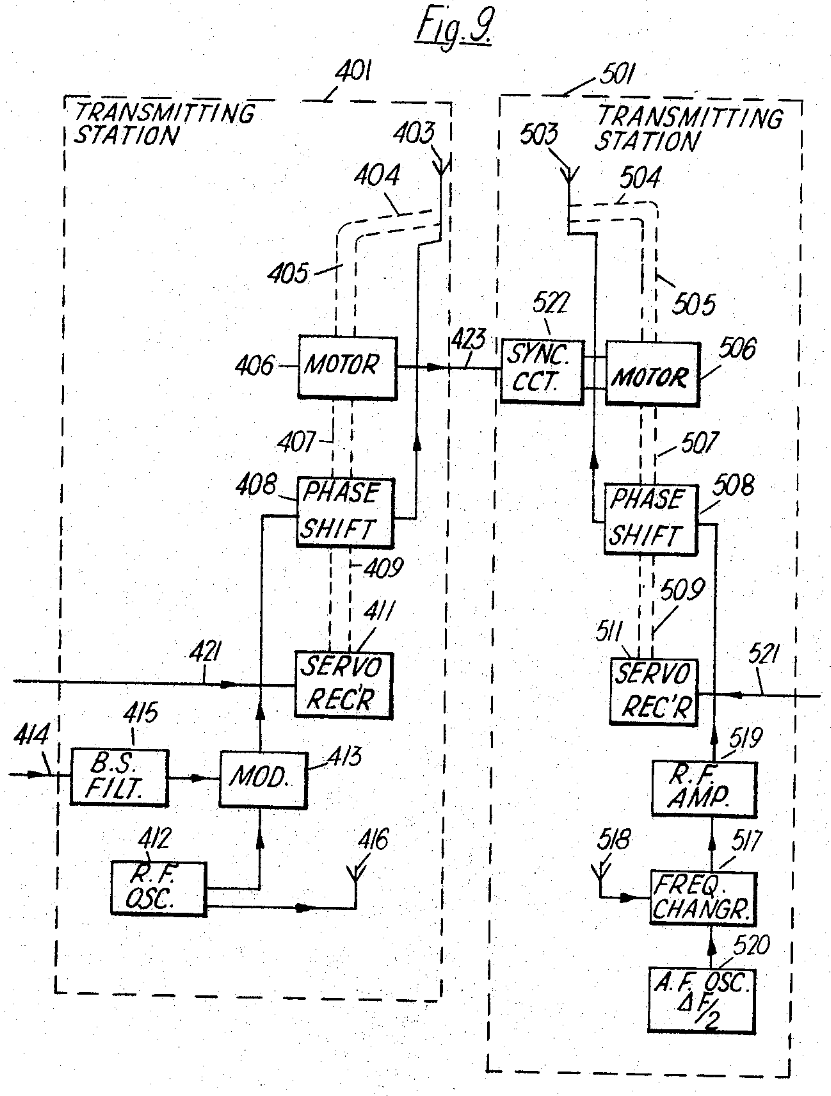

Embodiments of the invention in a system for selectively calling unidentified aircraft in a particular zone will now be described by reference to the accompanying drawings in which:

FIG. 1 is a schematic diagram of ground station arrangements used in a first embodiment of the invention, FIG. 2 is a schematic diagram of craft-borne arrangements used in the first embodiment of the invention, FIG. 3 is a schematic diagram of ground station arrangements used in a second embodiment of the invention, FIG. 4 is a schematic diagram of craft-borne arrangements used in the second embodiment of the invention, FIG. 5 is a schematic diagram of modified ground station arrangements used in the second embodiment of the invention, FIG. 6 is a schematic diagram of craft-borne arrangements for use with modified ground station arrangements of FIG. 5, FIG. 7 is a schematic diagram of ground station arrangements used in a third embodiment of the invention, FIG. 8 is a schematic diagram of airborne arrangements used in the third embodiment of the invention, and FIG. 9 is a schematic diagram of ground station station arrangements used in a fourth embodiment of the invention.

Referring to FIG. 1 there is shown a control center, a master transmitting station and a slave transmitting station indicated by the broken-line rectangles 1, 2 and 3 respectively. In the particular embodiment which is intended for use with aircraft the position of an unidentified aircraft in a given zone is determined at the control center 1 and the positional information is fed in the form of two separate analogue control signals separately to each of the ground stations 2 and 3. At each of these ground stations there is a directional aerial array which is orientated as a result of the control signals in such a way that two beams of radiation each having a very narrow width in azimuth are produced by the aerial arrays and intersect at a point corresponding to the predetermined position of the aircraft.

The control station 1 includes a radar plan position indicator (P.P.I.) 4 upon which the range and bearing in azimuth of the aircraft are indicated. Two cursor lines 5 and 6 are marked on transparent overlays pivoted about points 7 and 8 on the P.P.I. display corresponding to the positions of the ground stations 2 and 3. The overlays on which the cursor lines 5 and 6 are mounted are each coupled by means shown at 9 and 10 which, in the embodiment of the invention, are constituted by gearing, to respective servo transmitters 11 and 12. Other means such as mechanical linkage or electrical control circuits may be used to provide the coupling overlays between the overlay and the servo transmitters.

The signal output from the servo transmitter 11 is fed via an electrical path 13, which in the embodiment of the invention is a land-line, to a servo receiver 14 at the transmitting station 3. Similarly the signal output from the servo transmitter 12 is fed via a land-line 15 to a servo receiver 16 at the transmitting station 2.

At the transmitting station 2 the signal output from the servo receiver 16 is used to control the orientation of a highly directional aerial array 19 through the drive shaft 18 of an electric motor 17. The drive shaft 18 is mechanically coupled to the antenna array 19 via a rotary coupling arrangement 20. The ground station 2 also includes a generator 21 of radio signals of frequency $F/2$, one signal output of which is fed to the input of a combined frequency doubler and amplitude modulator unit 22, the signal output of which is fed via the rotary coupling device 20 to the directional aerial array 19.

The transmitting station 3 includes the servo receiver 14, the signal output of which is fed to a motor 23 having a drive shaft 24 coupled to a directional aerial array 26 via a rotary coupling arrangement 25. The servo receiver 14, the motor 23, the rotary coupling arrangement 25 and the aerial array 26 correspond respectively to the servo receiver 16, the motor 17, the rotary coupling arrangement 20 and the aerial array 19 at the ground station 2.

In addition the ground station 3 includes an audio frequency generator 27 of output frequency $\Delta F/2$, a frequency changer 28 coupled to the output circuit of the generator 27, and an amplifier 29 coupled to the output circuit of the frequency changer 28 and having an output fed to the directional aerial array 26 via the rotary coupling arrangement 25. A second input signal to the frequency changer 28 is provided by a receiving aerial 30 coupled thereto. The aerial 30 receives a signal at frequency $F/2$ radiated from a transmitting aerial 31 which is coupled to the output circuit of the generator 21 at the transmitting station 2.

The operation of the system in this embodiment of the invention is as follows. The two cursor-lines 5 and 6 are rotated about the pivot points 7 and 8 so as to intersect at a spot on the p.p.i. representing the unidentified aircraft. Signals representing the bearing in azimuth of the aircraft with respect to the two ground stations are generated by the servo transmitters and fed via the land-lines 13 and 15 to the corresponding servo receivers 14 and 16 located at the ground stations 2 and 3. The angular settings of the drive shafts 18 and 24 of the motors 17 and 23 are respectively controlled by the servo receiver 16 and 14 so that the directional aerial arrays 19 and 26 are orientated so that two narrow beams of radio signals radiated from each of the arrays intersect at the indicated position of the unidentified aircraft. The signals radiated from the aerial array 19 are at the second harmonic of the frequency of the generator 21 and have a frequency F. The signals radiated from the aerial array 26 have a frequency $F+\Delta F$. This result is achieved in this embodiment by mixing the signal at the frequency $F/2$ in the frequency changer 28 with the signal at the audio frequency $\Delta F/2$ from the generator 27. A signal component at frequency $F+\Delta F$ is extracted from the output of the frequency changer 28 and is fed to the aerial array 26 after amplification in the amplifier 29. Two signals, one at frequency F and the other at frequency $F+\Delta F$, will therefore be received at an aerial situated within a vertical region of very small area defined by the intersection of the two narrow beams. Since the two beams are extremely narrow this very small area can for practical purposes be considered to be a point since the possibility of another aircraft being within the area is remote. The space within which the amplitude singularity exists is thus for practical purposes a vertical line. In practice the probability that there is another aircraft vertically above or below the first aircraft is remote. The resultant amplitude of the signal received fluctuates at a frequency ΔF at this point, and at this point only. An aerial situated at the same point in azimuth but at a different altitude might also receive the fluctuating signal depending upon the width in elevation of the two beams.

Any frequency drift of the signal at $F/2$ generated by the generator 21 at station 1 is compensated for by a corresponding frequency drift of the signal at $F/2$ applied to the frequency changer 28 at station 2. Any convenient sub-harmonic or harmonic of the frequency F may be used instead of $F/2$. If the frequency F is itself used for this purpose there is a danger that signals at both F and $F+\Delta F$ may be received at points other than the intended point. Any other convenient way of ensuring that the relative drift of the frequencies of the signals radiated from the directional aerial arrays 19 and 26 are controlled to an amount which is much less than ΔF may be used.

The apparatus used to detect this singularity at the distant craft will now be described with reference to FIG. 2 of the accompanying drawings, which shows an A.M. radio receiver 40, the input circuit of which is connected to a receiving aerial 41. The output circuit from the detector of the receiver 40 is connected to the coil 42 of a relay, indicated by the broken-line rectangle 45, through a narrow band-pass audio frequency filter 44 and a tone rectifier 52. Contacts 46 of the relay 45 are connected between an indicator lamp 47 and terminals 48 of a lamp supply. The output from the detector in the receiver 40 is also connected to headphones 49 through a band-stop audio frequency filter 50 and contacts 51 of the relay 45.

When the two narrow beams from the ground-stations 2 and 3 are received simultaneously by the antenna 41 an audio frequency tone of frequency ΔF is produced in the detector of the receiver 40 and this is detected by the tone rectifier 52 to produce a direct current signal which energizes the coil 42 of the relay 45, causing the contacts 46 and 51 to close and the lamp 47 to be lit.

In cases where the unidentified aircraft is fitted with R/T receiving apparatus, the detection of the tone in the tone detector 52 could be used to unblock a normally blocked speech channel between the control center 1 and the aircraft to enable communication to be made exclusively with the pilot of the aircraft concerned.

It may be desired to make the system self-contained and not dependent upon an external radio telephony system for the communication of speech from the control center to the pilot. Apparatus which can be used to effect this independence will now be described. Referring to FIG. 1 a microphone 35 and speech amplifier 32 are provided at the control center 1. The output from the speech amplifier 32 is connected to the amplifier modulator 22 at the transmitting station 2 via a land-line 33 and a band stop filter 34 which attenuates any components at ΔF. The speech signals from the control station modulate the amplitude of the carrier wave of frequency F in the transmitter 22, which is radiated from the aerial array 19. The speech and ΔF signals are separated in the aircraft receiver by means of the audio filters 52 and 50 and are fed to the headphones 49 when the contacts 51 are closed.

The method of locating the spot on the P.P.I. used in this embodiment of the invention is only one of a number of possible ways of achieving this. The spot could be located, for example, by means of two line traces on the screen of the P.P.I. which are made to intersect at the spot by adjustment of the deflecting voltages.

Although only two transmitting stations are used in this embodiment of the invention in order to obtain a well-defined point of intersection of the narrow beams of radiation at all points within the range of the system it is sometimes necessary to use at least three transmitting stations. A general broadcast to all the aircraft in a given area can be made by omnidirectional radiation of speech signals upon which a tone of frequency ΔF is superimposed.

A second embodiment of the invention will now be described. In this embodiment three ground transmitting stations are used to produce three trains of signal pulses in a radiation pattern having a time singularity at the predetermined position of an unidentified aircraft.

Referring to FIG. 3 the dotted rectangle 101 represents a control center which is provided with a radar equipment to determine the range of the unidentified aircraft with respect to three fixed points on the ground at which the transmitters 102, 103 and 104 are located.

The range information obtained from the radar equipment at the control center 101 is displayed on a cathodeday tube 105 upon the screen of which the positions of the transmitters 102, 103 and 104 are indicated by fixed markers 106, 107 and 108 respectively.

Three mechanical indexes are provided which can be set to coincide with the indicated position 109 of the unidentified aircraft on the cathod-ray tube 105. These mechanical indexes are coupled by any convenient means which in the embodiment of the invention consists of three mechanical couplings 110, 112 and 113 to three time delay circuits 114, 115 and 116 respectively, each of which is associated with a particular transmitter.

The mechanical indexes are coupled to the delay circuits in such a way that the time delay introduced by any one delay circuit associated with a particular transmitter, is proportional to the sum of the displacements of the indexes associated with the other two transmitters.

Each of the time delay circuits is connected between the output terminals of a pulse generator 117 and the modulator stage of a respective one of the three transmitters 102, 103 and 104. The delay circuits 114, 115 and 116 are respectively connected to transmitters 103, 104 and 102 by the paths 118, 119 and 121 which in the embodiment of the invention are narrow-beam radiative paths, but may consist of other types of paths such as cables.

For the purposes of explaining the operation of the system the slant range of the unidentified aircraft from each of the transmitters 102, 103 and 104 will be termed $X_1$, $X_2$, and $X_3$, respectively. At the control center 101 the corresponding displacement of the mechanical indexes from the fixed markers 106, 107 and 108 when set to coincide with the spot representing the position of the aircraft on the screen of the cathode-ray tube 105 will be denoted by $x_1$, $x_2$ and $x_3$, respectively.

The time delay of the delay circuit 116 varies in accordance with $x_2+x_3$, that of the delay circuit 115 varies in accordance with $x_1+x_2$, and that of the delay circuit 114 varies in accordance with $x_1+x_3$. Differences in the time of transmission of the pulses along the paths 118, 119 and 121 are compensated for by fixed delays in the delay circuits 114, 115 and 116.

Instead of using three mechanical indexes one mechancial index could be used and its displacement from each of the markers 106, 107 and 108 determined by mechancial and electrical means and used to control the delay introduced by the delay circuits.

The pulses modulate the amplitude of signals radiated from the transmitters 102, 103 and 104 to produce three pulses modulated wave trains at carrier frequencies $f_1$, $f_2$ and $f_3$ respectively. At the position occupied by the unidentified aircraft the pulses of the three trains coincide in time. If the propagation times of the transmitted pulses between the transmitters 102, 103 and 104 be denoted by $T_{X1}$, $T_{X2}$ and $T_{X3}$, respectively, and the delays introduced by 114, 115, and 116 be denoted by $\tau_{x2}+\tau_{x3}+\tau_{x1}$, respectively, then $$TX1+\tau_{x1}=TX2+\tau_{x2}=TX3+\tau_{x3}$$

where, $$\tau_{x1}\approx x2+x3$$

$$\tau_{x2}\approx x1+x3$$

and $$\tau_{x3}\approx x1+x2$$

A speech modulated transmission at a frequency $f_4$ is radiated from a transmitter 122 located at the control center 101.

The apparatus used in the aircraft to detect the time coincidence between the pulses will be described with reference to FIG. 4. The equipment includes a receiving aerial 130 coupled to the input circuit of a unit 131 comprising a radio frequency amplifier and a local oscillator. The output circuit of the unit 131 is coupled to the input circuits of four intermediate frequency amplifier and detector units 132A, 132B, 132C and 132D.

The signal output from the amplifiers 132B, C and D is fed to a coincidence gate 133, the output of which is fed to the coil 134 of a relay 135. Switch contacts 136 of the relay 135 are connected between one terminal of an alarm lamp 137 and a lamp power supply connected across terminals 138.

The signal output from the intermediate frequency amplifier and detector 132A is coupled to an audio amplifier 139. The signal output from the audio amplifier 139 is fed to relay switch contacts 142 which are connected in series with headphones 143.

Pulse trains at carrier frequencies of $f_1$, $f_2$ and $f_3$ are received at the aerial 130 and in addition a speech transmission at a carrier frequency $f_4$. The carrier speech transmission is derived from a transmitter 122 located at the control center 101 and radiated from an aerial 123 (FIG. 3).

The received signals are amplified in the unit 131 and beaten in a mixer with a signal at frequency F from a local oscillator. Beat frequency components at frequencies $F-f_4$, $F-f_3$, $F-f_2$ and $F-f_1$ are selected and amplified in the units 132A, 132B, 132C and 132D respectively. The modulation superimposed on the beat frequency signals consists, in the case of the unit 132A, of speech signals which are amplified in the audio amplifier 139. The modulation superimposed on the signals in the units 132B, C and D consists of pulses, which at the position of the unidentified aircraft which is being called, are present at the same time. The three coincident pulses cause the gate circuit 133 to produce an output signal which energizes the relay 135, causing the contacts 136 and 142 to close.

This causes the alarm lamp 137 to be illuminated and speech to be fed to the headphones 143.

In the case of aircraft at positions in azimuth or at altitudes other than that of the aircraft being called, the three pulses at the input to the gate circuit 133 will not be present at the same time and the relay 135 will not therefore be energized.

A modification of the previous embodiment will now be described. Referring to FIG. 5 there is shown a part of the arrangements at a control center similar to that shown at 101 in FIG. 3. The time delay circuits 214, 215 and 216 correspond to the time delay circuits 114, 115 and 116 of FIG. 3, and are connected between the output terminals of a pulse generator 217 and the modulator stages of three transmitters which correspond to the transmitters 102, 103 and 104 of FIG. 3. All three transmitters radiate the same carrier frequency $f$, however and not three different frequencies as in the previous embodiment of the invention. The delay circuits 215 and 216 are not coupled directly to the output terminals of the pulse generator 217, but are coupled via an additional delay circuit 218 of fixed time delay T, and the delay circuit 216 is coupled to the output terminals of the delay circuit 218 via a further delay circuit 219 of fixed time delay T.

A distant aircraft will receive three trains of pulses staggered in time by varying amounts, but only at the aircraft being called will this time delay between corresponding pulses of the three trains equal the fixed delays, T and 2T, introduced at the control center. The apparatus at the distant aircraft for detecting when the time delays between the corresponding received signal pulses have the particular values T, and 2T will be described with reference to FIG. 6.

The aircraft apparatus is similar to that used in the previous embodiment of the invention in so far as it includes a combined radio frequency amplifier and mixer unit 231 having input terminals coupled to a receiving aerial 230. The mixer stage is excited by a local oscillator at frequency F and beat frequency components at $F-f$ and $F-f_4$ are selected, amplified and demodulated in two intermediate frequency and detector stages 232A and 232B respectively. The frequency $f_4$ is radiated from a speech modulated transmitter at the control center which corresponds to the transmitter 122 of FIG. 3.

The demodulated signal output from the unit 232A consists of three trains of pulses staggered in time by the same amount as the pulses at receiving aerial 230. All these pulse trains are fed to a gate circuit 233 along each of three parallel paths consisting of a direct path 245, a time delay circuit 241 of time delay T, and a time delay circuit 240 of delay 2T. When the received pulses are staggered in time by T and 2T pulses arriving at the input terminals of the gate circuit 233 are coincident in time and a signal is obtained from the output terminals of the gate circuit which energizes the coil 234 of a relay 235.

The demodulated signal output from the unit 232B consists of speech signals which are amplified in an audio frequency amplifier 239. When the coil of the relay 235 is energized, contacts 242 of the relay are closed and speech fed from the output terminals of the audio amplifier to headphones 243. Simultaneously contacts 236 of relay 235 are closed causing an alarm lamp 237 to be connected across a lamp power supply which is connected to terminals 238.

Using the method described in the modification to the second embodiment of the invention a general broadcast to a number of aircraft can be made by transmitting three trains of pulses from the control center spaced by the standard delays of T and 2T. The pulses then arrive at all the aircraft with the correct spacing to open the speech path.

In a third embodiment of the invention which will now be described two transmitting stations are used on the ground each of which produces a radiated field characterized in that a particular phase (or frequency) condition can be made to exist along a vertical plane in a desired direction. The two aerial systems can be orientated in such a way that the two planes representing the condition can be made to intersect along a vertical line which includes the position occupied by the aircraft to be called, at which a suitable receiver can detect the phase (or frequency) singularity which exists at that particular position.

To illustrate the principle of this embodiment, consider a single aerial radiating a continuous wave signal. If the aerial is moved to and fro in simple harmonic motion on a horizontal linear path the radiated signal bears a phase-modulation at the frequency of the cyclic movement, the amount of the phase modulation varying with direction in azimuth with respect to the line of motion.

A polar diagram of the phase modulation depth against bearing in azimuth from the mid-point of the aerial path is a "figure-of-eight," the major axis of which is along the direction of motion of the aerial. The depth of the phase modulation along a plane which is the perpendicular bisector of the path of motion of the aerial is substantially zero, although a small amount of phase modulation at double the frequency of the cyclic movement of the aerial occurs at points on the perpendicular bisector very close to the mid-point of the aerial path. In practice the phase modulation can be taken to be zero along the plane of the perpendicular bisector of the path of motion of the aerial.

If a similar moving aerial at a distance from the first radiates a continuous wave signal differing by an audio frequency from the first signal the audio frequency output from an A.M. receiver situated at any arbitrary point in the radiation fields of both aerials will in general consist of an audio beat note phase modulation at the frequency of cyclic movement which is assumed to be the same for both the aerials. The phase modulation is not present at the line of intersection of the two perpendicular bisector planes of the respective linear paths along which the aerials move. Undesired mutual cancellation of the phase modulation of the beat note, which would otherwise occur at positions in which the received continuous wave signals had identical phase modulations, is avoided by arranging the cyclic movements of the two aerials to be in quadrature.

In order to call an aircraft whose position is known it is necessary to orientate the paths traversed by the two aerials in such a way that the aircraft is at the intersection of the perpendicular bisectors of the paths.

In one embodiment of the invention, movement of an aerial in simple harmonic motion along a linear path is simulated by commutating radio frequency energy sequentially to individual antennae spaced apart from each other by the appropriate distances in a linear array.

Referring to FIG. 7 there are shown two ground transmitter stations indicated by the dotted rectangles 301 and 302. At each transmitter station a linear array of similar aerials 303 is mounted, and radio frequency energy is commutated in cyclic sequence to each of the antennae of the arrays by means of commutator arrangements 304. Each of the commutators consists basically of a capacitor switch arrangement made up of a series of fixed plates 305, each connected to a respective aerial in the arrays 303, and a movable plate 306 which is driven backwards and forwards by a drive 320 along a path parallel with the stator plates 305. Movable plates are driven backwards and forwards—not rotated—in FIG. 7. The movable plates of both commutators are driven in synchronism but with a fixed relative displacement so that the cycle of commutation in the two arrays 303 is 90 degrees out of phase. Although a capacitive commutator is used in the embodiment of the invention, other types of commutator as for example a commutator using switched semiconductor elements could be used instead. The frequency of the commutation cycle at both transmitters is synchronized from a master audio frequency source 307 located at the transmitting station 301. Signals from the master audio frequency source 307 are used to control a slave audio frequency source 308 after phase shift by 90 degrees at the transmitting station 302 over a land-line 309.

A radio frequency signal at a frequency $F/2$ is generated in an oscillator 312 at the transmitting station 301 and the second harmonic of the signal is amplitude modulated in an amplifier-modulator stage 313 prior to being fed to the antennae of the array 303 via the commutator 304. The amplitude of the radio frequency signal at frequency F can be modulated by a speech signal derived from the control center in the same way as in the first embodiment of the invention and shown in FIG. 1. The speech signals are applied to the modulator stage 313 via a land-line 314 from the control center and a band-stop filter 315 having maxium loss at frequency $\Delta F$.

A part of the radio frequency signal at frequency $F/2$ generated in the oscillator 312 is radiated from an aerial 316 and received at a receiving aerial 317 located at the transmitting station 302. The aerial 317 is coupled to input terminals of a frequency changer 318. A second pair of input terminals of the frequency changer 318 is connected to a low frequency oscillator 319 of frequency $\Delta F/2$. The output terminals of the frequency changer 318 are connected to the input of a radio frequency power amplifier 321. The output terminals of the amplifier 321 are coupled sequentially via the commutator arrangement 304 to each of the aerials of the array 303.

The output circuit of the mixer 318 selects a harmonic beat frequency component, at $F+\Delta F$, which is radiated by the aerial array 303 of the transmitter station 302. Any convenient sub-harmonic or harmonic of F may be used instead of $F/2$. It should be clear to one ordinarily skilled in the art that any of the methods presently known may be used for ensuring that the relative frequency drift between the signals radiated from the transmitting stations 301 and 302 remains within predetermined limits in order to maintain proper synchronization of the system.

The position of the aircraft being called is determined at the control center in the same way as in the previous embodiments of the invention and information regarding the bearing of the aircraft with respect to the two transmitting stations is used to control the orientation of the aerial arrays 303 by means of a servo system similar to that used to control the orientation of the aerial arrays 19 and 26 of FIG. 1 and described in connection with the first embodiment of the invention. The aircraft equipment used to detect the absence of phase modulation superimposed on the received signal will now be described.

Referring to FIG. 8 there is shown a receiving aerial 322, the radio frequency and intermediate frequency stages 323 of a receiver the input circuit of which is coupled to the aerial 322. The output circuit of the stage 323 is connected to an amplitude modulation detector stage 324. The output circuit of the detector 324 is connected via a band-stop filter 325 tuned to the frequency $\Delta F$ to one of a pair of contacts 326 of a relay 327, the other contact being connected to a pair of headphones 328.

The part of the output signal from the amplitude modulation detector 324 which consists of the audio frequency $\Delta F$ is coupled through an audio band-pass filter 329 to a phase modulation detector 331. The output circuit of the phase modulation detector 331 is connected to one input circuit of an anti-coincidence gate circuit 330. An A.C. signal detector 336 is connected between the input terminals of the phase modulation detector 331 and a second input to the gate circuit 330. The output circuit of the gate 330 is connected to the coil 337 of the relay 327.

The relay 327 is provided with a second pair of contacts 333 which are connected between terminals 334 of a lamp power supply and an alarm lamp 335. When the coil of the relay 327 is energized the contacts 326 and 333 are closed allowing speech signals to pass to the headphones 328 and causing the lamp 335 to be illuminated. The gate 330 is designed to give an output only when it receives a signal from detector 336 and no signal from detector 331. When this condition exists the contacts 326 and 333 of the relay 327 close, thereby causing the alarm lamp 335 to be illuminated and speed signals to be fed to the headphones 328.

When phase modulation is present on either of the received signals an output is obtained from the phase modulation detector 331 and is fed to one input circuit of the gate 330. If signals are received from both transmitters an output is also obtained from the detector 336 and is fed to the second input circuit of the gate 330. Under these conditions the gate 330 provides no output and therefore the coil 337 of the relay 327 remains unenergized. Unless signals are received from both transmitters, detector 336 gives no output, gate 330 remains closed and relay 327 does not operate.

In a fourth embodiment of the invention which will now be described two ground transmitters are used to produce two radiation patterns of substantially the same kind as described in the previous embodiment. The same equipment can be used in an aircraft to detect the singularity of the radiation pattern as is shown in FIG. 8. The equipment at the ground transmitting stations differs from that used in the previous embodiment in that at each station a single aerial is moved along a circular path and the aerial is fed with radio frequency energy the phase of which is changed cyclically in accordance with the aerial movement in such a way that the aerial appears to move to and fro on a diameter of the circle of revolution of the aerial.

Such a system avoids the possibility of interaction between the individual aerials of an aerial array and also provides a convenient means for orientating the direction of zero phase modulation.

Referring to FIG. 9 the two ground transmitting stations are indicated by the dotted rectangles 401 and 501. Where one of the units of the ground station 501 corresponds to one of the units of the ground station 401 the units and tens digits of the reference numerals of the respective units are the same but "4" is used in the hundreds digit position for all the units forming part of the station 401, and "5" is used in the hundreds digit for all the units forming part of the station 501.

At each of the ground stations an aerial 403, 503 is mounted on the end of a horizontal arm 404, 504 which is attached to a rotating vertical shaft 405, 505 driven at a constant speed by an electric motor 406, 506. The motors 406 and 506 are coupled by further drive shafts 407, 507 to the rotor of a mechanically driven phase shifter device 408, 508. The stator of the phase shifter device 408, 508 is coupled by a mechanical coupling 409, 509 to a servo receiver 411, 511 controlled over land-line 421, 521 by servo-transmitters located in a control center, similar to the control center 1 of FIG. 1. As before, the servo transmitters at the control center are used to translate the angular coordinates of the position of the unidentified aircraft into two electrical control signals.

The above-mentioned apparatus is common to both the transmitting stations 401 and 501. The remaining apparatus will now be described. At the transmitting station 401 a radio frequency oscillator 412 has one output circuit coupled to a modulator 413 and a second output circuit coupled to an aerial 416. An input circuit of the modulator is connected via a land-line 414 and an audio frequency band-stop filter 415 having maximum loss at a frequency $\Delta F$ with a speech transmitter located at the control center. The output circuit of the amplifier and modulator 413 is connected to the signal input circuit of the phase shifter 408, and the output circuit of the phase shifter 408 is coupled via a rotating joint and feeder to the dipole aerial 403.

At the transmitting station 501 a frequency changer (mixer) 517 has two input circuits one of which is coupled to an audio frequency oscillator 520 of frequency $\Delta F/2$ and the second of which is coupled to an aerial 518. The output circuit of the frequency changer is coupled to the input circuit of a radio frequency amplifier 519. The output circuit of the radio frequency amplifier 519 is connected to the signal input circuit of the phase shifter 508, the output circuit of which is coupled via a rotating joint and feeder to the dipole aerial 503.

The motor 406 at the transmitting station 401 is provided with auxiliary windings to enable the motor 506 at the transmitting station 501 to be synchronized in speed and phase of rotation with it. The synchronizing signal is transmitted over a land line 423 to an input terminal of a speed and synchronization circuit 522, the output terminals of which are connected to the motor 506 of the transmitting station 501.

The oscillator 412 generates two radio frequency signals, one at frequency F is amplitude modulated in the modulator 413 by speech signals from the control center. A second signal at frequency $F/2$ is fed to the aerial 416. The modulated signals from the output of the modulator 413 are fed to the input circuit of the phase shifter 408 which consists of a capacitance goniometer the rotor of which is driven from the shaft 407 of the motor 406. The phase of the radio frequency energy fed to the gyrating aerial 403 is thereby shifted cyclically at the frequency of gyration of the aerial and the amount of the phase shift is made such that a signal received from the aerial appears to have originated from an aerial moving to and fro along a diameter of the circle of movement of the aerial. The orientation of the diameter along which the aerial appears to oscillate is determined by the relationship between the phases of gyration of the aerial and of the phase shifter 408. This phase relationship is controlled in accordance with one of the angular co-ordinates of the position of the aircraft by means of the servo-motor 411 which is coupled by the coupling 409 to the stator plates of the phase shifter 408 and produces a displacement of the stator plates relative to the rotor of the phase shifter.

At the transmitting station 501 a signal at frequency $F/2$ radiated from the aerial 416 is received by the aerial 518 and fed to the mixer 517. The signal at frequency $\Delta F/2$ from the audio frequency oscillator 520 is also fed to the mixer 517 and a signal at frequency $F+\Delta F$ is selected at the output circuit of the mixer and amplified in the amplifier 519. The amplified signal is then fed via the phase shifter 508 and a rotating joint to the aerial 503. The orientation of the diameter along which the aerial 503 appears to move is controlled by the second angular co-ordinate signal which is received from the control center over the land-line 521 and which controls the relative angular positions of the rotor and stator plates of phase shifter 508.

By orientating the two diameters along which the aerials 403 and 503 appear to move in accordance with the angular co-ordinate information determined at the control-center, the desired phase singularity at the aircraft may be produced. The apparatus used to detect the phase singularity at the aircraft is the same as that shown in FIG. 8.

The gyrating aerials 403 and 503 could be replaced by two circular aerial arrays with means to commutate radio frequency energy from the phase shifters 408 and 508 to the aerials cyclically and successively. Interaction effects may be troublesome when using such an array of aerials, however.

In a further embodiment of the invention the rho-theta co-ordinates of a craft or vehicle are determined at a control center. A narrow beam from a highly directional aerial system is directed at the aircraft and the radio frequency signals of the beam are modulated by a highly stable modulating signal. The craft carries a highly stable source of signal of the same frequency, which is initially synchronized with the ground modulating source and can be relied upon to stay in phase synchronism for many hours. Before the transmission is radiated from the ground station the phase or timing of the modulation is adjusted in accordance with the rho (distance) co-ordinate of the craft from the transmitting station, so that the modulation on the signal received in the aircraft is in phase with the locally-generated signal, a condition which can be detected and used as in previous embodiments.

The embodiments of the invention described above have been concerned with the production of a singularity of a parameter of a received signal at a given point in azimuth, or in both azimuth and elevation. In sparsely populated air spaces where there may be only a small probability of two or more aircraft being on the same bearing in azimuth from the control center, it is possible that the production of a singularity defining a vertical plane in a desired azimuth direction would be adequate, only one ground transmitting station being required. Another use for systems in which the singularity of the parameter of the received signal occurs along a vertical plane is to define the boundaries of control zones, airways or danger areas so that an alarm can be given in a craft crossing such a boundary.

The application of the invention is not restricted to air traffic control but could be used to control all kinds of radio equipped craft or vehicles.

The information relating to the position of the craft or vehicle may be determined at the control station by known systems such as radar or direction finding.

It is to be understood that the foregoing description of specific examples of this invention is made by way of example only and is not to be considered as a limitation on its scope.

What we claim is:

1. A radio communication system comprising at least one craft or vehicle and a plurality of separate transmitting stations including means at each station for radiating an electromagnetic beam and means for controlling the positions of the beams in dependence upon respective bearings of said craft or vehicle from the transmitting stations so that they intersect at the craft or vehicle, and a receiver in said craft or vehicle including means for receiving the radiations of the beams, means for producing a beat frequency signal from the radiations and indicating means operated in response to the presence of the beat frequency signal.

2. A radio communication system comprising at least one craft or vehicle, a plurality of separate transmitting stations, means to determine the position of said craft or vehicle with respect to at least two of said transmitting stations and including means at each station for radiating electromagnetic pulses, and means for controlling the timing of said electromagnetic impulses in dependence upon the respective ranges of the craft or vehicle from the transmitting stations for providing that the pulses are simultaneously present at the craft or vehicle.

3. A radio communication system as claimed in claim 2 wherein the respective frequencies of the electromagnetic radiation from the transmitting stations differ in frequency by a fixed amount.

4. Equipment on a craft or vehicle to operate in a radio communication system as claimed in claim 3 including means for receiving the signals from said transmitting station means for separating the signals at the respective frequencies and for detecting the simultaneous presence of the separated signals.

5. A radio communication system comprising at least one craft or vehicle, a plurality of separate transmitting stations, means to determine the position of said craft or vehicle with respect to at least two of said transmitting stations and including means at each station for radiating electromagnetic pulses, means at the transmitting stations for controlling the timing between the pulses in dependence upon the distance of the craft or vehicle from the transmitting stations, and equipment at the craft or vehicle including means for receiving said pulses and means for indicating a particular relationship between the timing of the pulses at the craft or vehicle.

6. A radio communication system comprising a craft or vehicle and means in communication with said craft or vehicle to determine a co-ordinate of the position of said craft or vehicle, an electromagnetic radiator, means for in effect producing an oscillatory movement of said electromagnetic radiator along a linear path, and means for controlling the position of the path in dependence upon said determined co-ordinate.

7. A radio communication system as claimed in claim 6 wherein the oscillatory movement of the radiator is a simple harmonic motion along a straight path, and the position of the path is so controlled that the craft or vehicle is on a perpendicular bisector of the said path.

8. A radio navigation system as claimed in claim 7 comprising a plurality of transmitting stations, each said station having an electromagnetic radiator and wherein the oscillatory movement of said electromagnetic radiators is in effect produced at each one of said transmitting stations and further comprising means for controlling the positions of the paths of movement of the respective electromagnetic radiators in dependence upon respective bearings of the craft or vehicle from the transmitting stations such that the perpendicular bisectors of the said paths of movement intercept at said craft or vehicle.

9. A radio communication system as claimed in claim 8 wherein the signals radiated by two of the electromagnetic radiators differ in frequency by a fixed amount, and the oscillatory movements of the radiating sources at the respective transmitting stations are in phase quadrature.

10. A radio communication system as claimed in claim 9 wherein each radiator is a linear array of aerials and said means for in effect producing the oscillatory movement of the electromagnetic radiators at each of the transmitting stations includes means for commutating radio frequency energy in cyclic sequence to each of the aerials of said linear array to simulate oscillatory movement of the radiators.

11. A radio communication system as claimed in claim 6 wherein said radiator is a gyrating aerial and said means for in effect producing the oscillatory movement of the radiating source is means for feeding said aerial with radio frequency energy having a phase which is varied cyclically in accordance with the gyration of the aerial by an amount such that the radiating source appears to move to and fro on a diameter of the gyration of the aerial, and said means for controlling the position of the simulated path of movement includes means for controlling the relationship between the cyclic phase variation of the radio frequency energy fed to the gyrating aerial and the phase of the gyration of the aerial.

12. A radio communication system as claimed in claim 11 comprising a plurality of transmitting stations, each said station having an electromagnetic radiator and wherein the oscillatory movement of said electromagnetic radiators is simulated at each one of said transmitting stations and further comprising means for controlling the positions of the paths of movement of said electromagnetic radiators in dependence upon respective bearings of the craft or vehicle from said transmitting stations such that the perpendicular bisectors of said paths of movement intercept at the craft or vehicle.

13. A radio communication system as claimed in claim 12 wherein the signals radiated by two of the electromagnetic radiators differ in frequency, and the oscillatory movements of the electromagnetic radiators are in phase quadrature.

14. Equipment on a craft or vehicle to operate in a radio communication system as claimed in claim 13 including means to receive the signals from said radiators, means to produce a beat signal from the signals received from two of the electromagnetic radiators, a first detector to detect the presence of phase modulation on the beat signal, a detector to detect the presence of the beat signal, and a gate circuit operable only in response to the simultaneous presence of the beat signal and the absence of phase modulation on the beat signal.

15. A radio communication system as claimed in claim 13 including means to receive the signals from said radiators and further comprising at one of said transmitting stations:

means for transmitting a position signal corresponding to the position of the radiating source at said one station, the transmitted position signal being at a subharmonic of the radiation frequency of the electromagnetic radiator at said one station; and further comprising at another of said stations:

means for receiving said position signal transmitted from said one station;

means for changing the frequency of said received position signal by a fixed amount; and means for multiplying the frequency changed position signal by a factor such that the frequency of the multiplied signal differs from the frequency of the signal radiated at the electromagnetic radiator at said one of said transmitting stations by a fixed amount.

References Cited

UNITED STATES PATENTS

| | | | |
|---|---|---|---|
| 1,821,921 | 9/1931 | Bangay. | |
| 2,514,436 | 7/1950 | Alvarez | 343—112 |
| 2,595,141 | 4/1952 | Herbst | 343—11 X |
| 2,972,141 | 2/1961 | Barlow et al. | 343—112 |
| 3,104,392 | 9/1963 | Towler | 343—7.5 X |
| 3,148,369 | 9/1964 | Zable et al. | 343—6 |
| 3,218,640 | 11/1965 | Kindle et al. | 343—7 |
| 3,222,672 | 12/1965 | Forestier | 373—7 X |
| 3,263,231 | 7/1966 | Smith et al. | 343—100 |

RODNEY D. BENNETT, *Primary Examiner.*

H. C. WAMSLEY, *Assistant Examiner.*